UNITED STATES PATENT OFFICE.

CHARLES EMILE SOANE, OF HORNSEY, LONDON, ENGLAND, ASSIGNOR OF ONE-HALF TO USHER-WALKER LIMITED, OF LONDON, ENGLAND.

RESILIENT COMPOSITION FOR PRINTERS' ROLLERS.

1,239,630.   Specification of Letters Patent.   Patented Sept. 11, 1917.

No Drawing.   Application filed July 11, 1916.   Serial No. 108,710.

*To all whom it may concern:*

Be it known that I, CHARLES EMILE SOANE, a subject of the King of England, residing in Hornsey, London, England, have invented certain new and useful Improvements in Resilient Compositions for Printers' Rollers, of which the following is a specification.

This invention is for improvements in resilient compositions for printers' rollers.

In the specification of United States patent application Ser. No. 878800 in the name of Charles Emile Sohn filed December 23rd, 1914, there is described a method for producing an infusible resilient composition from gelatinous compositions such as soaked glue and glycerin by treating such mixtures with hexamethylene-tetramin. The substance produced in the manner thus described did not possess the disadvantages of other gelatinous compositions not so treated or treated with formaldehyde or trioxymethylene, disadvantages which, in the case of untreated compositions, consist in their liability to distortion, fusion, or even bursting when subjected to a high temperature, and in the case of compositions treated with formaldehyde in the rapid setting of the gelatinous mixture and consequent diminution in strength of the resulting material.

Throughout this specification the term "infusible" as applied to the composition means that on the application of heat the composition does not melt, even at about the temperature of boiling water, and even beyond such temperatures no melting at all occurs but decomposition will of course eventually set in with the destruction of the composition.

It has now been found that the treatment of water-containing gelatinous compositions with other substances than hexamethylene-tetramin in the proportions mentioned in the specification referred to above can impart the desired degree of infusibility to such compositions, while at the same time giving them ample time to set in order to enable molding operations to be conveniently carried out and to produce a composition which is not weakened by the treatment it has been subjected to. The compounds which it has been found can be employed in the treatment of water-containing gelatinous compositions instead of hexamethylenetetramin are aldehydes belonging to the cyclic series, for example furfural, and the aldehyde-containing products such as caramel obtained by the pyrogenic decomposition of sugars such as sucrose.

According to this invention therefore a method of producing an infusible resilient composition for printers' rollers consists in treating a gelatinous water-containing mass, such as a mixture of glue soaked in water and glycerin, with a cyclic aldehyde, such for example as furfural, with furfuramid or with aldehyde-containing products obtained for example by the pyrogenic decomposition of sugars, such as sucrose.

The following is a description of one method of carrying this invention into effect in the production of printers' rollers:—

Glue is soaked in water until the desired quantity has been absorbed and then it is allowed to stand until flexible, after which it is mixed with glycerin in the usual proportions and these ingredients are melted up together say in a steam heated copper. The aldehyde or aldehyde-containing product is then introduced into this mixture. When the product to be added is insoluble, it is mixed into a cream with glycerin or water or a mixture of the two (preferably glycerin by itself is employed for this purpose) and added to the melted composition.

When the preparation of the composition is carried out by the addition of furfural to the mixture of soaked glue and glycerin, it is necessary to make the whole medium alkaline by the addition thereto of a small amount of ammonia.

It is preferred to use furfuramid rather than furfural itself. In this case 1–2% of furfuramid is added to the glue-glycerin mixture prepared as previously described, and the whole is heated for about two hours.

Instead of a cyclic aldehyde there may be added to the glue glycerin mixture prepared in the manner described above a proportion of a suitable sugar such as sucrose which produces on decomposition, in addition to other compounds, aldehydic substances, and so generates the required quantity of aldehydes *in situ*. Methylfurfural and hydroxymethylfurfural may be employed, and, indeed, these two substances are obtained in the pyrogenic decomposition of sugars.

Caramel either alone or together with furfural or furfuramid has also been employed for the treatment of the gelatinous mixture.

Suitable proportions in these cases are (a) for caramel alone 16% and (b) caramel 5% and furfural or furfuramid ½%, of the quantity of the gelatinous composition.

After the composition has been mixed the remainder of the process is carried out in the same manner as described in the previous United States application Ser. No. 878800 referred to above, namely, the whole is stirred and run into molds of the desired shape. It is unnecessary, however, to maintain the molds in a heated condition;—the ordinary summer temperature of a room sufficing to keep the molds at the desired temperature, and during the cooling the necessary reactions taking place in the composition.

The proportions mentioned in the above example have been found to be suitable to the particular treatment set forth, but it is to be understood that these proportions may be varied.

What I claim as my invention and desire to secure by Letters Patent is:—

1. The herein described method of producing an infusible resilient composition for printers' rollers which consists in treating a mixture of glue soaked in water and glycerin with furfural.

2. The herein described method of producing an infusible resilient composition for printers' rollers which consists in treating a mixture of glue soaked in water and glycerin with caramel.

3. The herein described method of producing an infusible resilient composition for printers' rollers which consists in treating a mixture of glue soaked in water and glycerin with caramel and furfural.

4. The herein described method producing an infusible resilient composition for printers' rollers which consists in treating a mixture of glue soaked in water and glycerin with furfural and an alkaline reagent.

5. The herein described method of producing an infusible resilient composition for printers' rollers which consists in treating a mixture of glue soaked in water and glycerin with furfural and ammonia.

6. The herein described method of producing an infusible resilient composition for printers' rollers, which consists in treating a mixture of glue soaked in water and glycerin with a substance containing a heterocyclic aldehyde.

7. The herein described method of producing an infusible resilient composition for printers' rollers, which consists in treating a mixture of glue soaked in water and glycerin with a heterocyclic aldehyde.

In testimony whereof I have signed my name to this specification.

CHARLES EMILE SOANE.